Aug. 29, 1939.　　　　　V. L. CUSTER　　　　　2,171,330
ROTARY CONVEYER GUIDE AND FORK FOR BARN CLEANING APPARATUS
Filed Aug. 22, 1938
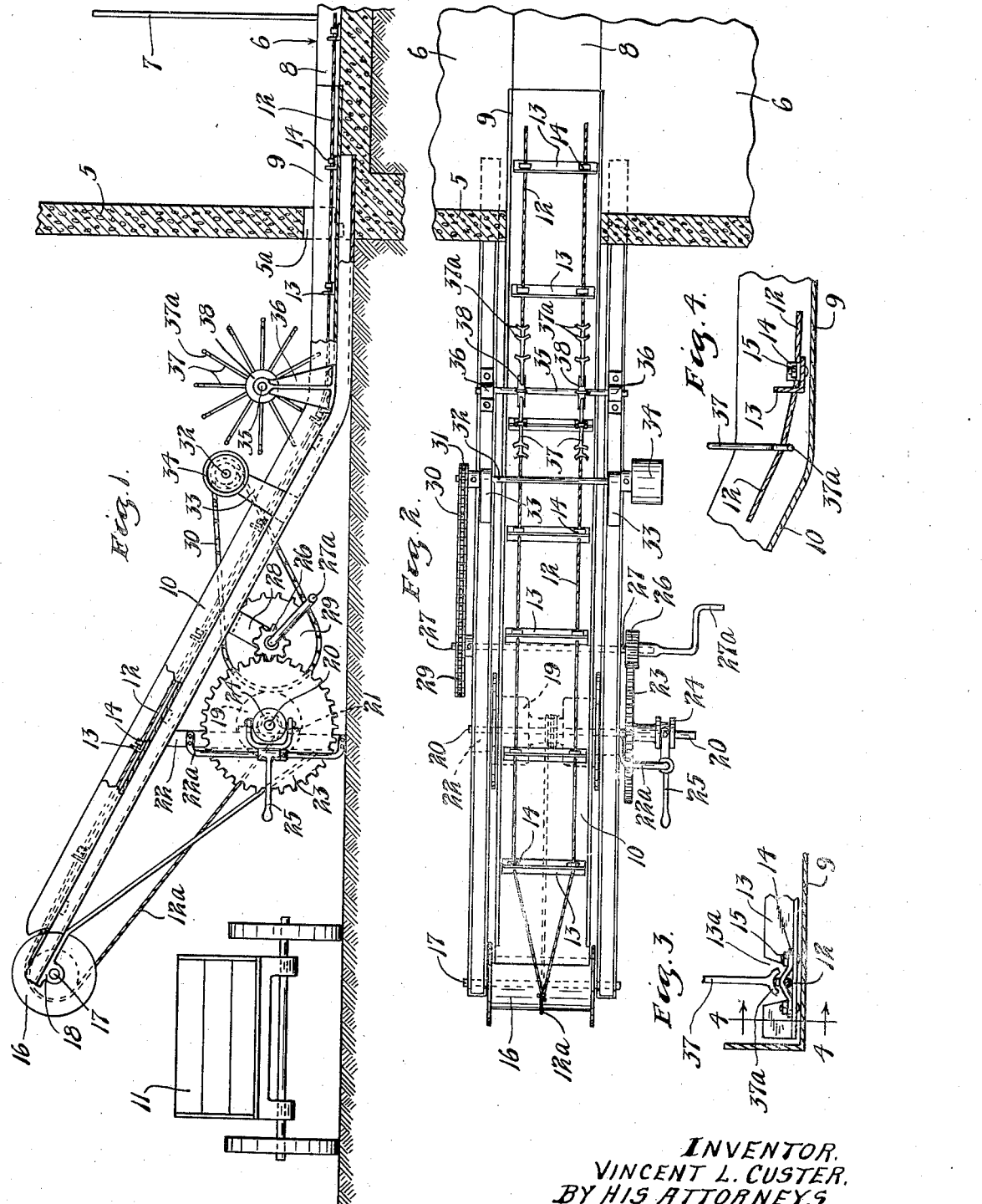
INVENTOR.
VINCENT L. CUSTER.
BY HIS ATTORNEYS.
Williamson + Williamson Patented Aug. 29, 1939

2,171,330

UNITED STATES PATENT OFFICE 2,171,330

ROTARY CONVEYER GUIDE AND FORK FOR BARN CLEANING APPARATUS

Vincent L. Custer, Eau Claire, Wis.

Application August 22, 1938, Serial No. 226,040

3 Claims. (Cl. 198—108)

My invention relates to conveyers and particularly to a conveyer-guiding and material-forking device for inclusion in manure removal conveying apparatus for animal barns.

In manure removal apparatus wherein a conveyer is situated in a trough which is horzontally disposed in its main portion and upwardly inclined in its delivery portion, tension on the conveyer tends to lift the conveyer out of the trough at the junction between said horizontal and inclined sections of the trough. Means, such as a roller, immediately above the conveyer at said junction would restrain the conveyer against being lifted but would constitute an obstacle in the way of material being carried on the conveyer.

An object of my invention is to provide a device capable of restraining a conveyer against upward displacement out of a trough and yet so constructed as to permit unobstructed movement of material on the conveyer therepast.

Another object is to provide such a device capable of material-forking action to assist movement of material therepast on the conveyer.

A further object is to provide such a device capable of particularly effective performance of its functions and being of simple, compact, rugged and inexpensive construction.

These and other objects and advantages of the invention will more fully appear from the following description made in connection with the accompanying drawing, wherein like reference characters refer to the same or similar parts, and, in which:

Fig. 1 is a partially broken away, partially sectional side view of a manure disposal conveyer apparatus having an embodiment of my invention incorporated therein;

Fig. 2 is a top view;

Fig. 3 is a partial vertical sectional view taken transversely of the apparatus to show certain details; and Fig. 4 is a partial sectional view taken on the line 4—4 of Fig. 3 as indicated by the arrows.

Referring to the drawing the numeral 5 refers to a wall of a building such as a dairy barn, within which building is a floor 6 on which is mounted the usual structure 7 which defines stalls for individual animals. The floor 6 is provided with a manure trough 8 in accordance with common practice in dairy barns.

Longitudinally aligned with the trough 8 is a trough structure preferably formed of material such as metal and which comprises one section 9 disposed horizontally and extending through a suitable opening 5a in the wall 5. Connected to the outer end of the trough section 9 is another trough section 10 which is inclined upwardly so that the outer end thereof is elevated to permit placement of a vehicle such as the wagon 11 therebeneath.

Within the troughs 8, 9 and 10 there is provided material conveying means movable longitudinally thereof. This means may consist of a pair of elongated flexible elements 12 such as steel cables or the equivalent carrying at intervals therealong cross pieces or slats 13. The slats 13 may be formed as shown of angle iron having notches 13a cut in the upwardly projecting leg thereof to receive the cables 12. The cables 12 may be secured to the slats 13 by means of clamps 14 attached to the slats 13 by suitable means such as nutted bolts 15. Preferably the nutted bolts 15 are constructed in the manner of carriage bolts with a rounded head disposed at the lower side of the slat 13. At the outer end of the conveying means the cables 12 are brought together and connected to a single cable 12a.

Means is provided for longitudinally moving the above described conveying means. At the outer end of the trough section 10 a drum 16 is mounted on a shaft 17 which in turn is journalled in suitable bearings 18 carried by the outer end of the trough section 10. Beneath the trough section 10 a winding drum 19 is carried on a shaft 20. The shaft 20 is journalled in suitable bearings 21 carried by vertical members 22 which serve to support the medial portion of the trough section 10. The drum 19 is adapted for winding thereon of the cable 12a and the slat carrying cables 12 so that material carried outwardly in the troughs 8, 9 and 10 will be discharged over the drum 16 and down into a vehicle such as the wagon 11 disposed therebelow. A gear 23 is mounted on one end of the shaft 20 in longitudinally shiftable non-rotatable relation thereto. The gear 23 is provided with a grooved shifting collar 24 associated with a shifting lever 25 which is mounted on a bracket 22a carried by one of the vertical trough supporting members 22. A pinion 26 adapted for meshing relation of the gear 23 therewith is mounted on a counter-shaft 27 journalled in a suitably apertured bracket 28 mounted on the lower side of the trough section 10. Operation of the lever 25 will bring the gear 23 into and out of mesh with the pinion 26. The shaft 27 is provided with a crank 27a for purposes of rotating the same. Provision is also made for driving the shaft 27 by power means. A sprocket 29 is mounted on the shaft 27 and connected by means of a sprocket chain 30 to another sprocket 31 carried by a second counter-shaft 32 which is journalled in brackets 33 mounted on the lower side of the trough section 10. The shaft 32 also carries a pulley 34 to which a suitable source of rotary mechanical power may be belted in a conventional manner.

With the above described construction it should be apparent that a heavy pull on the towing cable 12a will tend to cause the conveying means to be displaced upwardly at the junction between the horizontal and inclined trough sections 9 and 10. A roller placed above the conveying means to prevent such upward displacement of the same would, of course, constitute an obstacle which would interfere with movement therepast of material carried by the conveying means. I have devised means for holding down and guiding the conveying means at the junction between trough sections such as the sections 9 and 10 without creating an obstacle in the way of material being conveyed by the conveying means. My device is also capable of functioning in the manner of a rotary material-forking means and is constructed as will be described.

Substantially above the junction between the trough sections 9 and 10, and at a level a substantial distance above said junction I provide a rotatably mounted member such as the shaft 35, this shaft being disposed with its longitudinal and rotational axis transversely arranged relative to the trough sections 9 and 10. The shaft 35 is journalled at its respective ends in relatively tall upstanding bearing brackets 36 mounted on the respective sides of the trough structure. The shaft 35 carries thereon a series of radially projecting relatively slender elements 37 which may be conveniently mounted thereon by means of hubs 38. The slender radial elements 37 are arranged in two series or groups, each series or group being disposed in a vertical plane common to one of the cables 12 of the conveying means. The slender radial elements of each series thereof are spaced circumferentially of the series. Each element 37 is provided with means for engaging the corresponding one of the cables, this means preferably being of a nature suitable for straddling engagement with the cable. The cable engaging means shown in the drawing is provided by forming on the outer end of each of the slender elements 37 an outwardly opening V-shaped element 37a which is preferably formed integrally with its associated radial element 37. The V-shaped elements 37a carried by one series of the radial elements 37 form in effect a sheave capable of guiding one of the cables 12 and preventing upward movement of the cable 12.

My device is so arranged that the shaft 35 and the radial elements 37 carried thereby will rotate in unison with longitudinal movement of the conveyer cables 12. Such rotary movement of the shaft 37 is conveniently obtained from longitudinal movement of the cables 12 through frictional engagement of the V-shaped elements 37a with the cables 12.

It is to be noted that my above described device for holding down and guiding the cables 12 will afford no obstruction to movement of material carried along the troughs 9 and 10 by the conveying means. The shaft 35 is spaced a considerable distance above any such material passing thereunder. The radial elements 37a occupy but a small percentage of the width of the trough and furthermore are capable of piercing through a layer of material moving along the trough. The radial elements 37 since they pierce through the material and are in rotary motion constitute forking means for assisting the conveyer in moving material from the trough section 9 to the trough section 10.

While my rotary conveyer guiding and material-forking device has been illustrated and described as applied to the use of the device in connection with barn cleaning conveyer apparatus I am aware that the device is well adapted for use in connection with other types of conveyers and material moving apparatus.

It is apparent that I have invented novel, simple, compact, rugged, and inexpensive means for guiding a longitudinally movable conveyer from one to the other of two adjoining sections of a trough disposed at different angles to the horizontal and also capable of functioning as a rotary material-forking means for assisting a conveyer in moving material from one to the other of such sections of a trough.

It will, of course, be understood that various changes may be made in the form, details, arrangement and proportions of the various parts without departing from the scope of my invention.

What is claimed is:

1. In combination with a trough having respective sections disposed at respectively different angles relative to the horizontal and material-conveying means disposed in said trough for movement longitudinally thereof and including a flexible elongated element extending longitudinally thereof, means for forking material and guiding said flexible element from one to the other of said sections comprising, a member mounted for rotation about a horizontal axis extending transversely of said trough and spaced substantially above the junction between said respective sections, a series of radially outwardly projecting elements carried by said rotatable member substantially in a vertical plane containing said flexible element, and outwardly opening, generally V-shaped elements carried by the free ends of the respective radial elements and adapted for straddling engagement with said flexible element so as to constitute a guide sheave therefor, said radial and V-shaped elements constituting rotary material-forking means.

2. In combination with a trough having respective sections disposed at respectively different angles relative to the horizontal and material-conveying means disposed in said trough for movement longitudinally thereof and including parallel, flexible elongated elements extending longitudinally thereof, means for guiding said elongated elements and forking material from one to the other of said sections comprising, a member mounted for rotation about a horizontal axis extending transversely of said trough and spaced substantially above the junction between said respective sections, a series of radially outwardly projecting elements carried by said rotatable member substantially in each of the vertical planes containing said respective flexible elements, and outwardly opening, generally V-shaped elements carried by the free-ends of the respective radial elements and adapted for straddling engagement with said flexible elements whereby the V-shaped elements associated with each of said flexible elements constitute, in effect, a guide sheave therefor and said radial elements and V-shaped elements constitute rotary material-forking means.

3. In combination with a trough extending horizontally in a first portion thereof and, in a second portion, inclining upwardly from said first portion, and conveying means situated in said trough for movement longitudinally thereof and including spaced parallel flexible elongated elements carrying thereon material-engaging crosspieces, means for guiding said elongated elements and forking material from the horizontal portion to the inclined portion of said trough comprising, hubs rotatably mounted on a horizontal axis extending transversely of said trough and spaced substantially above the junction of said horizontal and inclined portions of the trough, a series of radial spokes carried by each of said hubs, each series of spokes being in a vertical plane common with one of said elongated elements, and outwardly opening generally V-shaped elements carried by the free ends of the respective spokes and adapted for straddling engagement with said elongated elements whereby the V-shaped elements associated with each of said hubs co-operatively constitute, in effect, a guide sheave and said spokes and V-shaped elements constitute rotary material-forking means.

VINCENT L. CUSTER.